(12) United States Patent
Rihtar

(10) Patent No.: US 11,614,095 B2
(45) Date of Patent: Mar. 28, 2023

(54) FUEL PUMP COVER

(71) Applicant: Honda Motor Co., Ltd., Tokyo (JP)

(72) Inventor: Jonathan A. Rihtar, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 467 days.

(21) Appl. No.: 16/735,809

(22) Filed: Jan. 7, 2020

(65) Prior Publication Data
US 2021/0207615 A1    Jul. 8, 2021

(51) Int. Cl.
*F04D 29/40* (2006.01)
*B60K 15/01* (2006.01)

(52) U.S. Cl.
CPC .............. *F04D 29/40* (2013.01); *B60K 15/01* (2013.01)

(58) Field of Classification Search
CPC .......... F04B 53/16; F04B 53/22; F04D 29/40; F04D 5/002; F04D 13/0693; B60K 15/01; B60K 2015/03243; B60K 2015/03453; B60K 15/03; B60K 15/077; B60K 2015/03447; B60K 15/035; B60K 15/03504; B60K 15/04; B60K 15/0406; B60K 15/073; B60K 2015/03059; B60K 2015/03105; B60K 2015/03111; B60K 2015/03217; B60K 2015/03236; B60K 2015/03467; B60K 2015/03509; B60K 2015/03557; F02M 37/103; F02M 37/0082; F02M 37/106; F02M 2037/082; F02M 2037/085; F02M 25/0854; F02M 33/08; F02M 37/0029; F02M 37/007;
(Continued)

(56) References Cited

U.S. PATENT DOCUMENTS 2,737,972 A * 3/1956 Callery ................... F16K 27/12
                                                    137/377
3,116,774 A * 1/1964 Callahan ................ B65D 25/34
                                                    150/156
(Continued)

FOREIGN PATENT DOCUMENTS

EP         2628937 A2     8/2013
KR       101746438 B1     6/2017
KR      20180031236 A     3/2018

OTHER PUBLICATIONS

Espacenet Machine Translation of EP Patent No. 2628937 A2, Issued Aug. 21, 2013.
(Continued)

*Primary Examiner* — Kenneth J Hansen
*Assistant Examiner* — Benjamin Doyle
(74) *Attorney, Agent, or Firm* — Plumsea Law Group, LLC

(57) ABSTRACT

A motor vehicle fuel pump cover system. The system protects a connection between a fuel line and a fuel pump. The cover includes a cover for a fuel pump. Both parts of the cover define a raised wall around the connection. The cover also includes a second cover. The second cover is hinged to the first cover and forms a dome to cover the connection. The dome has an interior peripheral surface that covers the raised wall to thereby form a chamber protected against foreign matter infiltration. In another aspect, the disclosure relates to a motor vehicle fuel pump having an exterior fuel connection protected by the cover system against damage caused by foreign matter.

19 Claims, 7 Drawing Sheets

(58) Field of Classification Search
CPC .... F02M 37/0076; F02M 37/10; F02M 37/20;
F02M 37/42; F02M 37/44; F02M 37/46;
F02M 37/50; F02M 37/00; F02M 37/04;
F02M 61/16; F02M 2200/05; F02B 61/02
USPC ................ 123/469, 497; 137/587, 296, 371;
220/4.14, 4.15
See application file for complete search history.

(56) References Cited

U.S. PATENT DOCUMENTS

| | | | | |
|---|---|---|---|---|
| 4,590,964 | A * | 5/1986 | Beardmore | F02M 37/103 137/590 |
| 4,591,319 | A * | 5/1986 | Takahashi | B60K 15/077 403/223 |
| 4,738,376 | A * | 4/1988 | Markus | B65D 47/148 220/834 |
| 4,909,522 | A * | 3/1990 | Flanigan | B62J 1/28 297/214 |
| 5,150,808 | A * | 9/1992 | Hamilton | B60K 15/0406 220/255 |
| 5,322,345 | A * | 6/1994 | Desser | B62J 1/18 297/214 |
| 5,462,190 | A | 10/1995 | Lienhart et al. | |
| 5,975,423 | A * | 11/1999 | Rice | B60S 3/044 239/360 |
| 6,036,061 | A * | 3/2000 | O'Donnell | B65D 51/24 215/276 |
| 6,182,693 | B1 * | 2/2001 | Stack | B60K 15/03504 137/565.17 |
| 6,206,037 | B1 * | 3/2001 | Murakoshi | F02M 37/106 137/565.22 |
| 6,701,982 | B1 * | 3/2004 | Ortiz | B67D 7/06 141/311 A |
| 7,069,643 | B2 * | 7/2006 | Shevela | B25B 27/0042 29/758 |
| 7,201,155 | B2 * | 4/2007 | Mills | F02M 33/08 123/520 |
| 7,341,046 | B2 * | 3/2008 | Leymarie | F02M 37/106 123/519 |
| 7,341,047 | B2 | 3/2008 | Sone et al. | |
| 7,642,459 | B2 | 1/2010 | Motoda | |
| 10,072,621 | B2 * | 9/2018 | Fukuoka | H02K 11/00 |
| 10,294,022 | B2 | 5/2019 | Blazer et al. | |
| 10,731,612 | B2 * | 8/2020 | Aponte Hernandez | F02M 37/103 |
| 11,274,762 | B2 * | 3/2022 | Fisch | F02M 37/20 |
| 2002/0017281 | A1 * | 2/2002 | Crary | F02M 37/20 123/516 |
| 2002/0174902 | A1 * | 11/2002 | Beyer | B60K 15/077 137/587 |
| 2003/0102033 | A1 * | 6/2003 | Dasilva | F02M 37/103 137/565.17 |
| 2005/0016621 | A1 * | 1/2005 | Klein | B60K 15/04 141/98 |
| 2005/0126546 | A1 * | 6/2005 | Yagisawa | B62J 37/00 180/219 |
| 2005/0194796 | A1 * | 9/2005 | Powell | F02M 37/103 220/298 |
| 2006/0081395 | A1 * | 4/2006 | Motoda | F02M 37/103 220/366.1 |
| 2007/0039963 | A1 * | 2/2007 | Krentz | B60K 15/04 220/304 |
| 2007/0089922 | A1 * | 4/2007 | Iwasaki | B62J 35/00 180/219 |
| 2007/0169975 | A1 * | 7/2007 | Kubota | F02M 37/103 180/69.4 |
| 2008/0035120 | A1 * | 2/2008 | Sone | F02M 37/103 348/674 |
| 2008/0078918 | A1 * | 4/2008 | Fujiwara | F02M 37/106 248/560 |
| 2008/0295808 | A1 * | 12/2008 | Tateishi | B01D 35/027 123/497 |
| 2009/0000601 | A1 * | 1/2009 | Takata | F02M 37/103 123/510 |
| 2009/0031995 | A1 * | 2/2009 | Tateishi | F02M 37/0082 123/509 |
| 2009/0217911 | A1 * | 9/2009 | Yokura | F02M 37/103 123/457 |
| 2012/0187131 | A1 * | 7/2012 | Claucherty | B60K 15/03 220/315 |
| 2019/0234357 | A1 * | 8/2019 | Aponte Hernandez | B60K 15/03 |
| 2020/0018273 | A1 * | 1/2020 | Rihtar | B60K 15/01 |
| 2020/0018274 | A1 * | 1/2020 | Rihtar | B60K 15/01 |
| 2020/0047841 | A1 * | 2/2020 | Luckjohn | B62K 19/46 |
| 2021/0095585 | A1 * | 4/2021 | Schiefer | F02M 37/44 |
| 2022/0252029 | A1 * | 8/2022 | Rihtar | B60K 15/03 |

OTHER PUBLICATIONS

Espacenet Machine Translation of KR Patent No. 101746438 B1, Issued Jun. 13, 2017.
Espacenet Machine Translation of KR Published Application No. 20180031236 A, Issued Mar. 28, 2018.

* cited by examiner

FUEL PUMP COVER

BACKGROUND

1. Field

The present disclosure relates to a fuel pump cover. In particular, the disclosure relates to a cover that reduces environmental damage to a fuel pump.

2. Description of Related Art

Motor vehicles comprise a variety of devices and systems to function. Many of these devices and systems are on the exterior of the vehicle, and therefore must be able to withstand damage from the environment. Such environmental damage may be the result of exposure to wind, water, road salt, chemicals used in motor vehicles, stones, rocks, and other particulates, for example. Thus, exterior parts on motor vehicles may be protected by being painted, chromed, or galvanized, for example.

The components in the undercarriage generally are protected by the vehicle structural parts and body, but, by and large, these components are exposed to environmental conditions because the undercarriage typically is not sealed from the elements. Treatments such as paint or chrome may be too expensive for application to all areas needing protection. These treatments also may not be sufficient for protection of some devices in a motor vehicle. The fuel pump normally has no cover. Further, the frame and structural components have not provided sufficient protection from incursion of water and other liquid chemicals and solutions, potentially leading to damage.

SUMMARY

In one aspect, the disclosure relates to a motor vehicle fuel pump cover system. The system protectively covers a connection between a fuel line and a fuel pump. The system includes a first cover member substantially covering the fuel pump. The first cover member defines a raised wall around the connection. The system also includes a second cover member. The second cover member is hingedly connected to the first cover member. The second cover member defines a dome to cover the connection. The dome has an interior peripheral surface that covers the raised wall to thereby form a chamber protected against foreign matter infiltration.

In another aspect, the disclosure relates to a motor vehicle fuel pump having an exterior fuel connection protected by the cover system against damage caused by foreign matter.

In yet another aspect, the disclosure is directed to a cover system for a motor vehicle fuel pump having an external connection. The system comprises a first cover member substantially covering a fuel pump and defining a raised wall around the connection. The system further comprises a second cover member mated with the raised wall on top of the first cover member. The first cover member and the second cover member define a protective chamber for the external connection when closed.

Other systems, methods, features, and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

Figure 1:
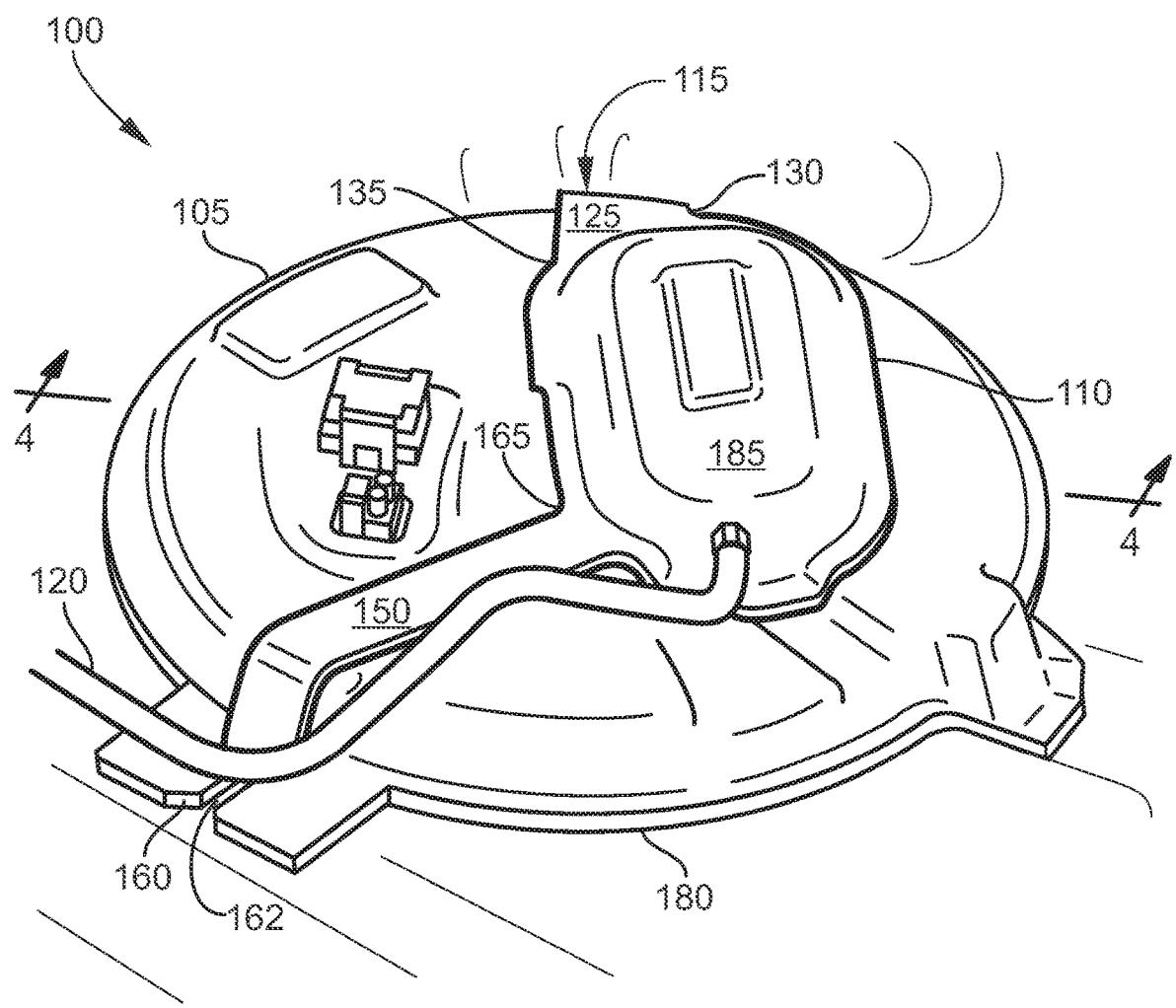
FIG. 1 illustrates an embodiment of a fuel pump cover on a fuel pump with the cover closed.
Figure 2:
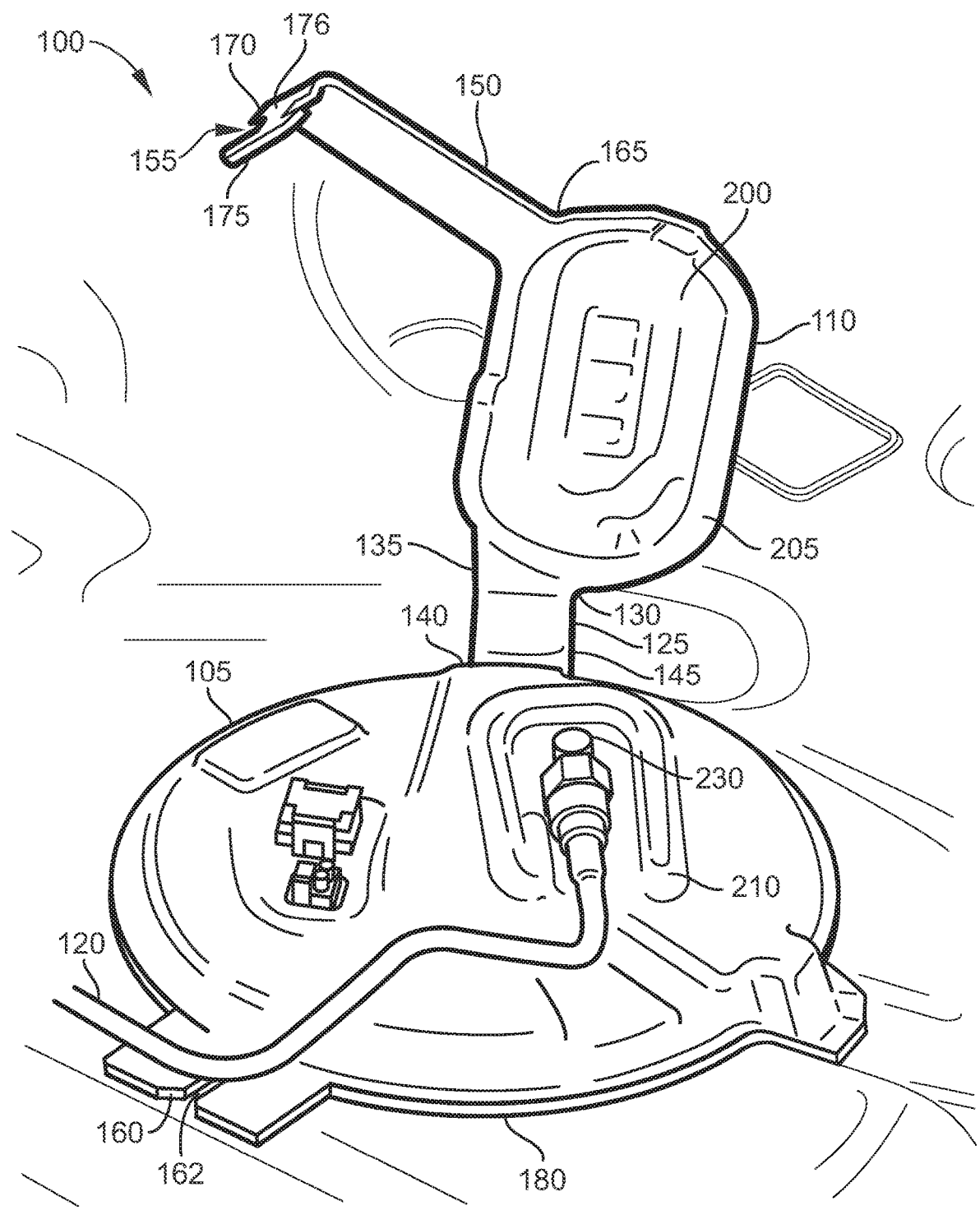
FIG. 2 illustrates an embodiment of a fuel pump cover on a fuel pump with the cover open.
Figure 3:
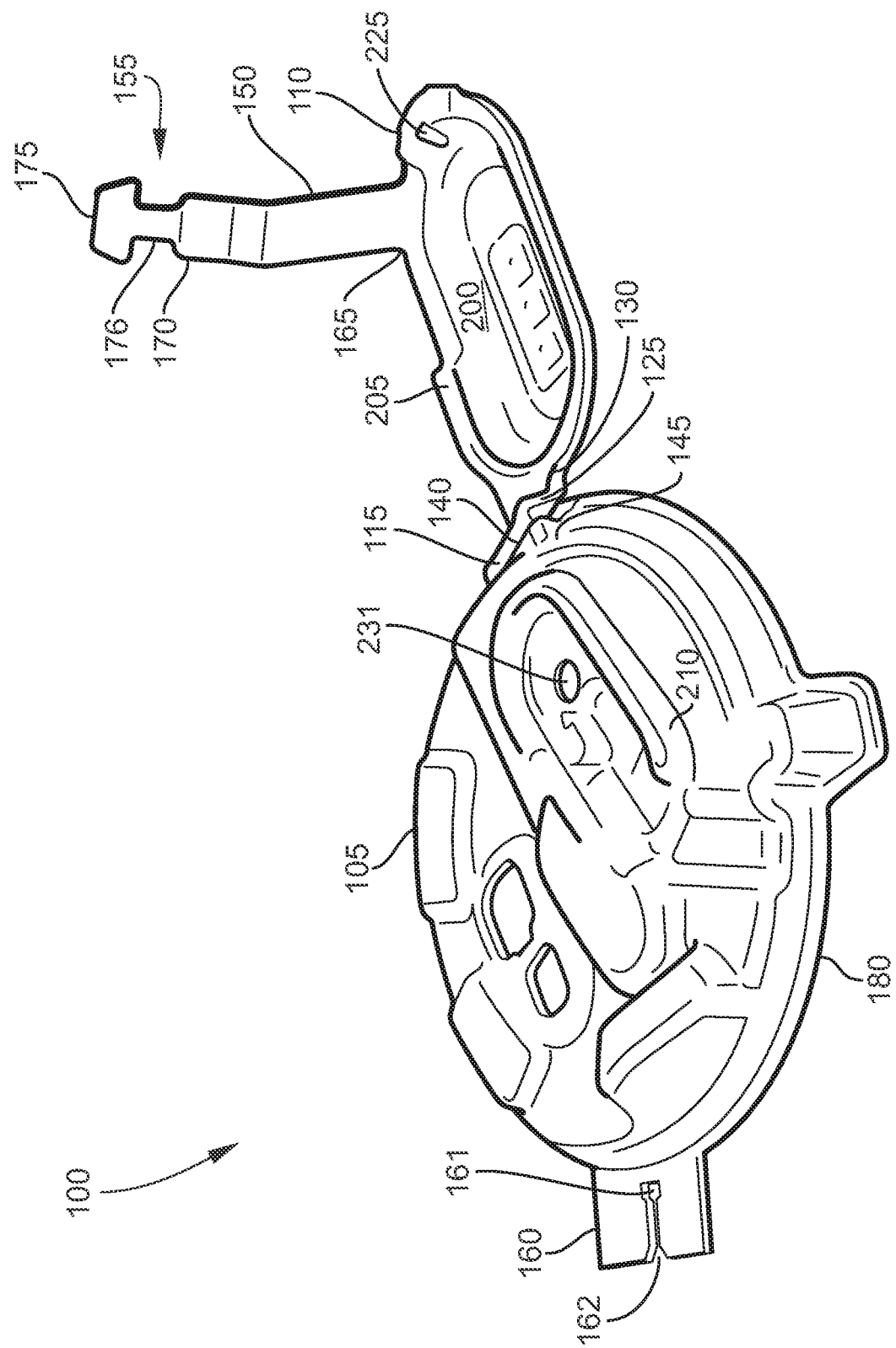
FIG. 3 illustrates an embodiment of a fuel pump cover.

FIG. 1 and FIG. 2 illustrate an embodiment of a motor vehicle fuel pump cover system in place on a fuel tank and covering a fuel pump. FIG. 3 illustrates the same embodiment of a motor vehicle fuel pump cover system shown in isolation. System 100 is a cover system comprising a first cover member 105, which is a base located on the fuel tank, and a second cover member 110, which is a lid that covers the fuel connection. First cover member 105 has a rim 180 in contact with the fuel tank. Second cover member 110 is illustrated as closed, with dome 185 of second cover member 110 covering fuel connection 230 (see FIG. 2). Second cover member 110 is connected to first cover member 105 at hinge 115, which, together with hinge tab 125, enables second cover member 110 to be opened and closed over fuel connection 230. Hinge 115 enables the formation of first cover member 105 and second cover member 110 as a single piece. Hinge tab 125 extends from first end 135 at first edge 130 of second cover member 110 to second end 145 (see FIG. 2) at periphery 140 of first cover member 105. Fuel line 120 enters the dome at fuel line passage 225 (see FIG. 3).

As illustrated in FIG. 1, when the cover of this embodiment is closed, second cover member 110 is held in place by tether 150. Tether 150 extends from a periphery 165 of second cover member 110 substantially opposite hinge 115 to attachment element 155 at end 170 remote from second cover member 110 (see FIG. 2). In some embodiments, tether 150 may be located at another location on second cover member 110 other than periphery 165. Tether 150 is attached to the rim of first cover member 105 at mating element 160 on periphery 140 of first cover member 105.

In the embodiment shown in FIG. 1, tether attachment element 155 serves to hold tether 150 substantially in place with second cover member 110 in a closed position. Tether attachment element 155 includes retaining tab 175 and strip member 176. Tether attachment element 155 cooperates with mating element 160. Mating element 160 includes notch 161 (see FIG. 3) and slot 162. Details relating to these features are set forth below as they relate to FIG. 9. Other embodiments of such a tether also may be suitable.

In embodiments, tether 150 retains second cover member 110 in a substantially closed position, in cooperation with the fit relationship between first cover member 105 and second cover member 110. As illustrated on FIG. 2 and FIG. 3, first cover member 105 includes raised wall 210, which forms a perimeter substantially completely around fuel connection 230. Raised wall 210 on first cover member 105 cooperates with wall 205 on the interior 200 of second cover member 110 when second cover member 110 is closed. In this embodiment, the walls cooperate to form a domed chamber protected against foreign matter infiltration. In this way, embodiments protect fuel connection 230 from damage from environmental factors, such as water, chemicals, snow and ice, and stones.

Figure 4:
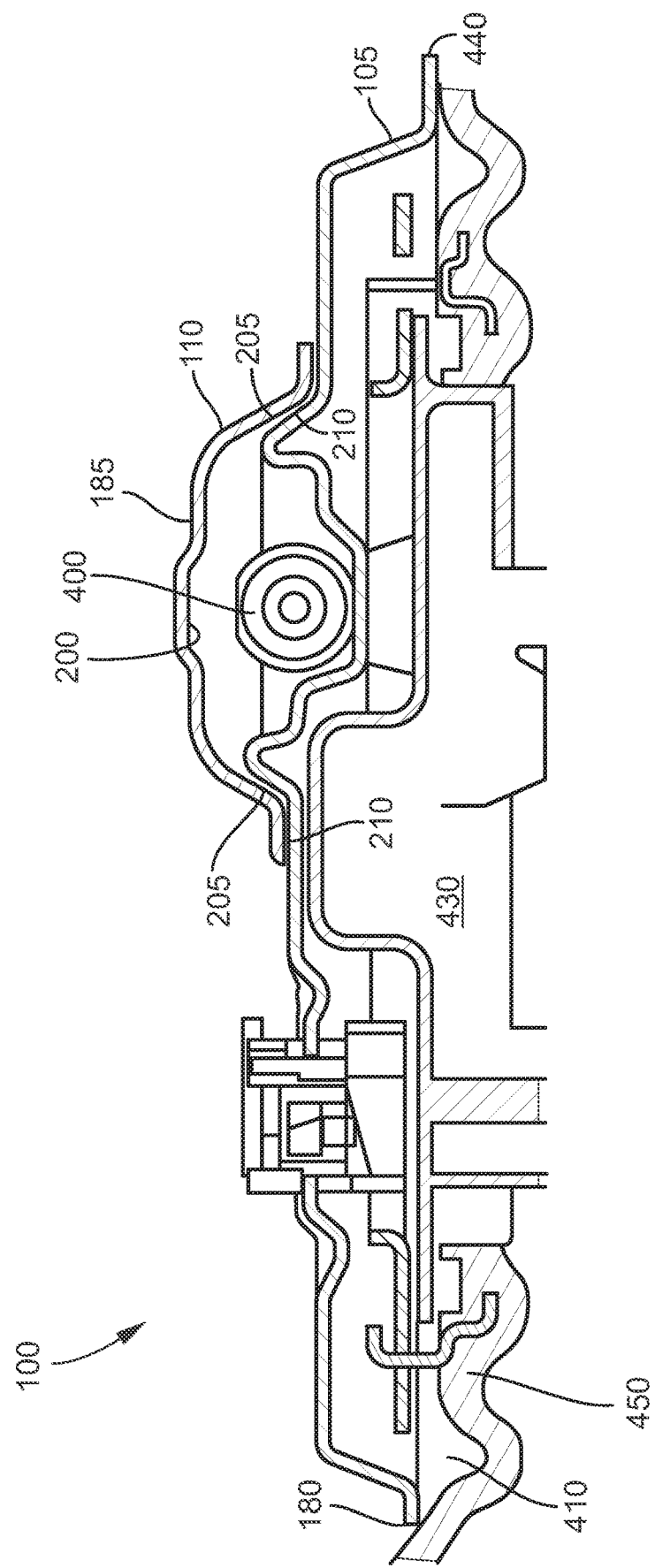
FIG. 4 illustrates a cross-section of the fuel pump cover of the embodiment of FIG. 1 in place on a fuel pump.

FIG. 4 is a cross-sectional view taken at line 4-4 of the embodiment of FIG. 1. As can be seen in the embodiment illustrated in FIG. 3 and FIG. 4, motor vehicle fuel pump cover system 100 is retained on fuel pump 430 by fuel connection 230 (see FIG. 2). Fuel connection 230 passes through fuel connection passage 231. Thus, motor vehicle fuel pump cover system 100 is retained in place on fuel pump 430.

As can be seen in FIG. 1, FIG. 2, FIG. 3, and FIG. 4, the closure of first cover member 105 and second cover member 110 defines a chamber 200, and second cover member 110 forms dome 185 over fuel connection 230. Dome 185 defines a space over fuel connection 230, so that the fuel connector does not touch interior 200 of second cover member 110 in normal use. In particular, FIG. 4 illustrates the distance between fuel connection 400 and inner surface 200 of second cover member 110. Further, motor vehicle fuel pump cover system 100 does not push on fuel connector 400 even if motor vehicle fuel pump cover system 100 is displaced or deformed, as for example in a collision. The composition of motor vehicle fuel pump cover system is described in detail below.

FIG. 4 also illustrates the relationship of wall 205 on the interior of second cover member 110 and wall 210 on first cover member of first cover member 105 when the second cover member is lowered and covers first cover member. Wall 205 and wall 210 provide an interior peripheral surface cooperating with the raised wall thereby to form a passageway that essentially precludes entry of water and particulates into the interior volume.

Wall 205 may cover wall 210 such that they are adjacent to one another as illustrated. Engagement of wall 205 and wall 210 includes the possibility of the walls touching one another or simply being adjacent to one another and in spaced relation. When wall 205 does not touch wall 210, the walls may be separated by a small distance, as illustrated in FIG. 4. This relationship forms a labyrinthine or serpentine passage which tends to prevent incursion or infiltration of foreign matter, including fluids. In some embodiments, these walls need not completely preclude entry of foreign matter so long as the structure tends to block the flow of water and particulates. Wall 205 and wall 210 may touch one another and still include the labyrinthine or serpentine passage between the two.

In some embodiments, there may be a fuel tank 450 drain channel; one such channel is illustrated in FIG. 4 as fuel tank drain channel 410. As can be seen, motor vehicle fuel pump cover system 100 does not block or impinge upon fuel tank drain channel 410.

Figure 5:
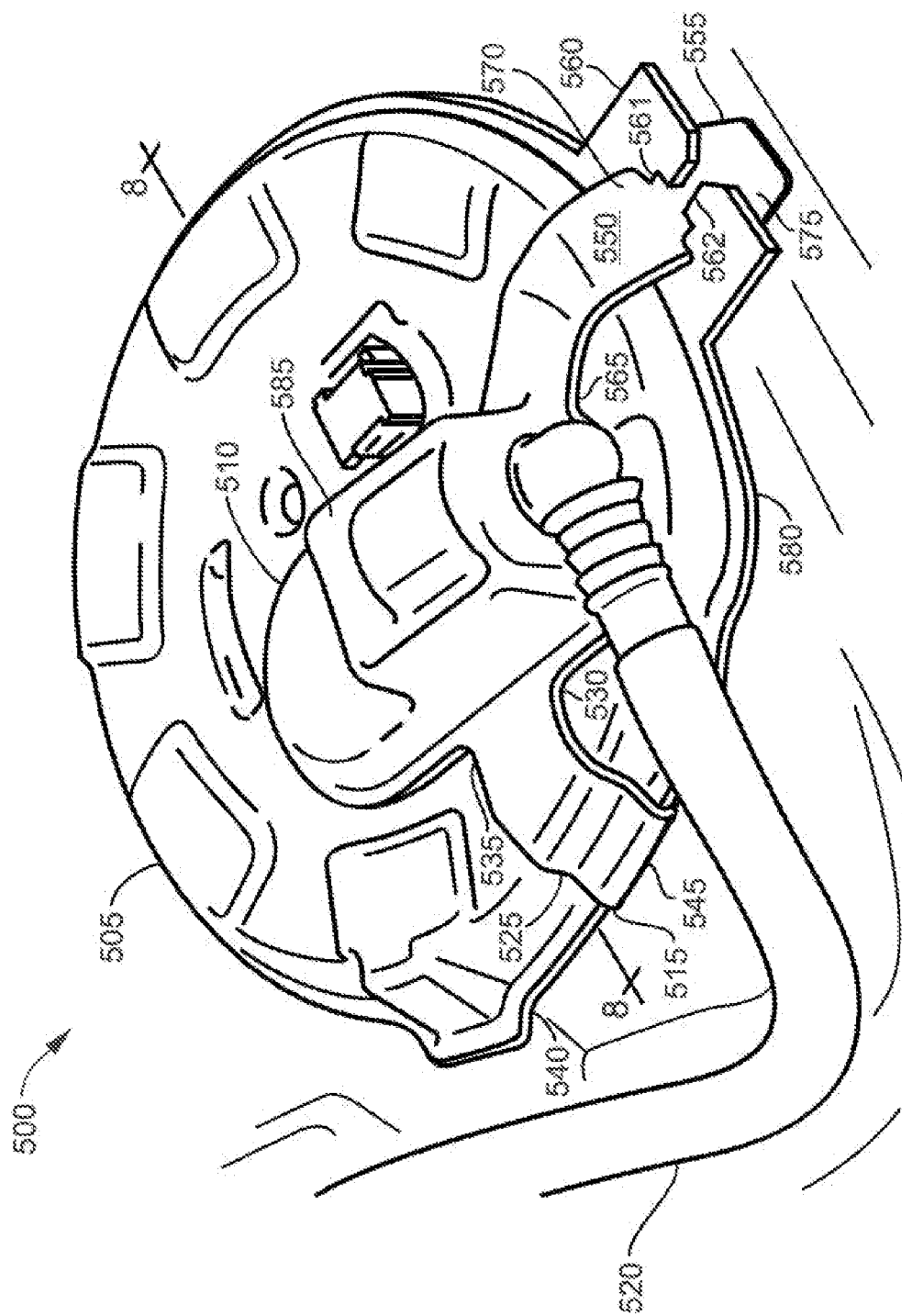
FIG. 5 illustrates another embodiment of a fuel pump cover on a fuel pump with the cover closed.
Figure 6:
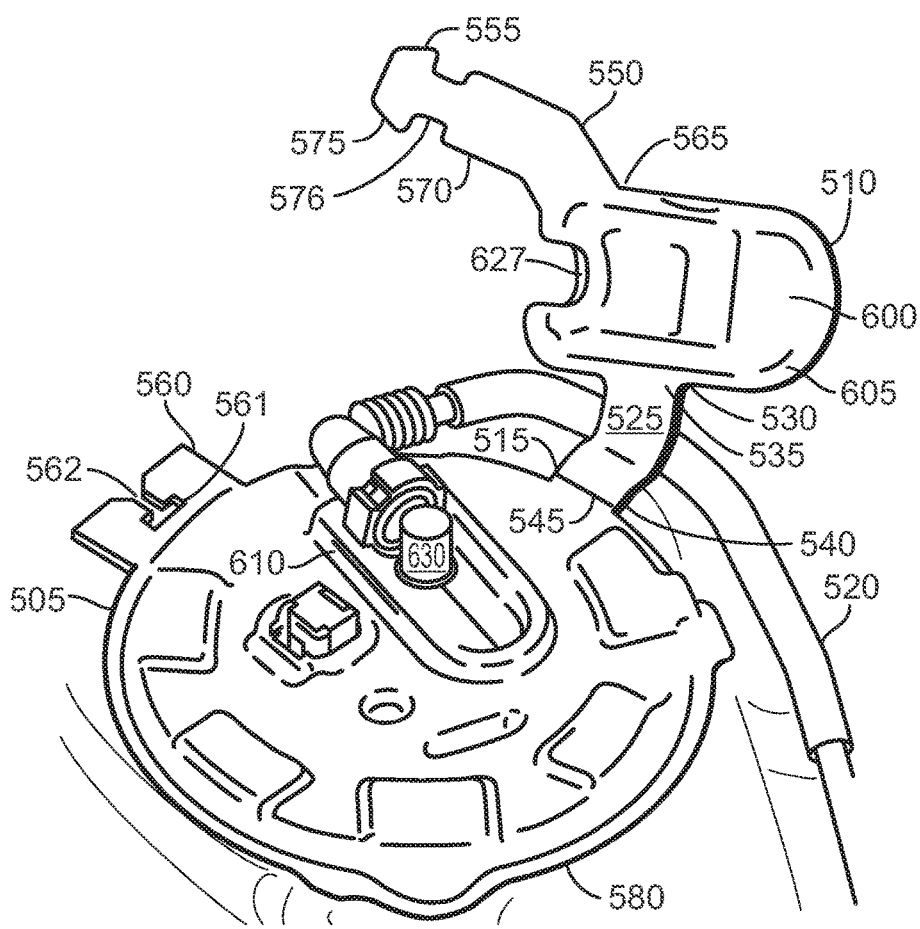
FIG. 6 illustrates another embodiment of a fuel pump cover on a fuel pump with the cover open.
Figure 7:
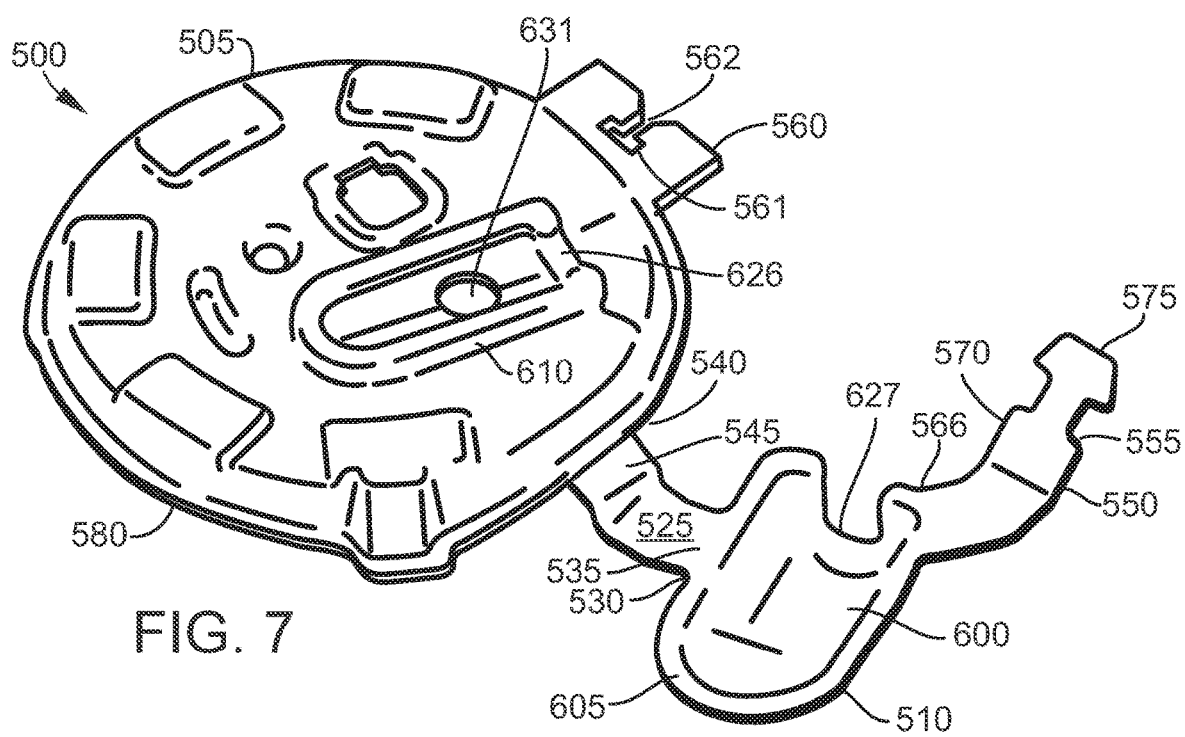
FIG. 7 illustrates another embodiment of a fuel pump cover.

Other embodiments of aspects of the disclosure are set forth in FIG. 5, FIG. 6, FIG. 7, and FIG. 8. In particular, FIG. 5 and FIG. 6 illustrate another embodiment of a motor vehicle fuel pump cover system in place on a fuel tank and covering a fuel pump. FIG. 7 illustrates the same embodiment 500 of a motor vehicle fuel pump cover system shown in isolation. First cover member 505 of system 500 has rim 580 in contact with the fuel tank. Second cover member 510 is illustrated as closed, with dome 585 of second cover member 510 covering fuel connection 630 (see FIG. 6). Second cover member 510 is connected to first cover member 505 at hinge 515, which, together with hinge tab 525, enables second cover member 510 to be opened and closed over fuel connection 630. Hinge 515 enables the formation of first cover member 505 and second cover member 510 as a single piece. Hinge tab 525 extends from first end 535 at first edge 530 of second cover member 510 to second end 545 at periphery 540 of first cover member 505. Fuel line 520 enters the dome at slot 627 (see FIG. 6).

As illustrated in FIG. 5, when the cover of this embodiment is closed, second cover member 510 is held in place by tether 550. Tether 550 extends from a periphery 535 of second cover member 505 substantially opposite hinge 515 to attachment element 555 at end 570 remote from second cover member 510 (see FIG. 6). Tether 550 is attached to the rim of first cover member 505 at mating element 560 on periphery 540.

In the embodiment shown in FIG. 5, tether attachment element 555 serves to hold tether 550 substantially in place in a closed position. Tether attachment element 555 includes retaining tab 575 and strip member 576. Tether attachment element 555 cooperates with mating element 560. Mating element 560 includes notch 561 and slot 562.

In embodiments, tether 550 retains second cover member 510 in a substantially closed position, in cooperation with the fit relationship between first cover member 505 and second cover member 510. As illustrated on FIG. 6 and FIG. 7, first cover member 505 includes raised wall 610, which forms a perimeter substantially completely around fuel connection 630. Raised wall 610 on first cover member 505 cooperates with wall 605 on the interior 600 of second cover member 510 when second cover member 510 is closed. In this embodiment, the walls cooperate to form a domed chamber protected against foreign matter infiltration. In this way, embodiments of a dome protect fuel connection 630 from damage from environmental factors, such as water, chemicals, snow and ice, and stones.

Figure 8:
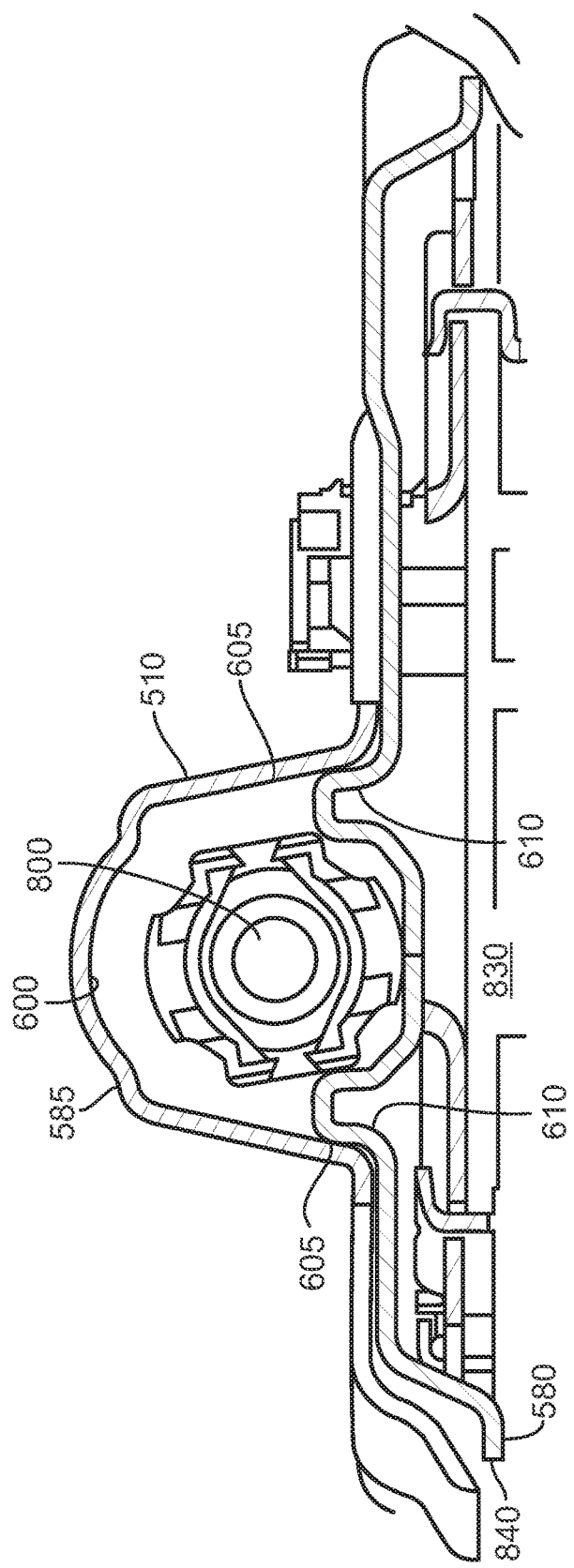
FIG. 8 illustrates a cross-section of the fuel pump cover of the embodiment of FIG. 5 in place on a fuel pump.

FIG. 8 is a cross-sectional view taken at line 8-8 of the embodiment of FIG. 5. As can be seen in the embodiment illustrated in FIG. 7 and FIG. 8, motor vehicle fuel pump cover system 500 is retained on fuel pump 830 by fuel connection 630. Fuel connection 630 passes through fuel connection slot 627. Groove 626 through wall 610 cooperates with fuel connection slot 627 to accommodate fuel connection 630. This embodiment maintains the ability of motor vehicle fuel pump cover system 500 to protect against foreign matter infiltration despite the discontinuity in wall 605 and wall 610. The embodiment also allows for removal of second cover member 510 without disconnection of fuel line 520 from fuel connection 630. Fuel connection 630 passes through fuel connection passage 631 and retains motor vehicle fuel pump cover system 500 in place on fuel pump 830.

As can be seen in FIG. 5, FIG. 6, FIG. 7, and FIG. 8, the closure of first cover member 505 and second cover member 510 defines chamber 600, and second cover member 510 forms dome 585 over fuel connection 630. Dome 585 defines a space over fuel connection 630, so that the fuel connector does not touch interior 600 of second cover member 510 in normal use. In particular, FIG. 8 illustrates the space between fuel connection 800 and inner surface 600 of second cover member 510. Further, motor vehicle fuel pump cover system 500 does not push on fuel connector 600 even if motor vehicle fuel pump cover system is displaced or deformed, as for example in a collision.

FIG. 8 also illustrates the relationship of wall 605 on the interior of second cover member 510 and wall 610 on first cover member of first cover member 505. Wall 605 and wall 610 provide an interior peripheral surface cooperating with the raised wall thereby to form a passageway that essentially precludes entry of water and particulates into the interior volume.

As illustrated in FIG. 8, wall 605 and wall 610 engage one another such that they are adjacent when wall 605 covers wall 610. Wall 605 and wall 610 may touch each other or be adjacent to one another and in spaced relation. When wall 605 engages wall 610, as illustrated in FIG. 8, this relationship forms a labyrinthine or serpentine passage which tends to prevent incursion or infiltration of foreign matter, including fluids, specifically because the passage is blocked by the walls. In some embodiments, these walls need not completely preclude entry of foreign matter so long as the structure tends to block the flow of water and particulates.

Thus, as can be seen, the walls of the first cover member and the second cover member engage one another in a covering relationship. In embodiments in which the walls do touch when engaged, the contact tends to aide in blocking the flow of water and particulates.

Figure 9:
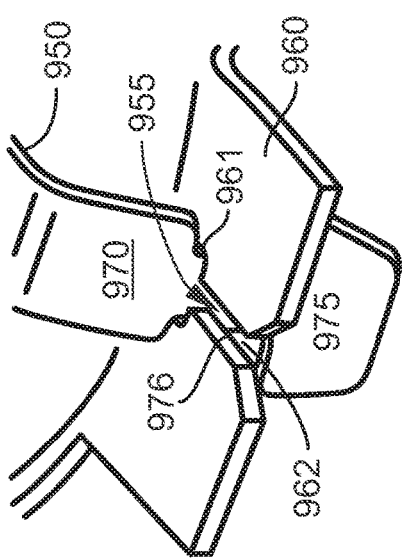
FIG. 9 illustrates an embodiment of a latch for a tether on the fuel pump cover.

FIG. 9 illustrates the details of an embodiment of an attachment element and a mating element so that a tether on a second cover member may be secured to a feature on a first cover member. In an embodiment, an attachment element at the end of the tether may include a section or strip that is narrower than the tether and a retaining tab that typically may be wider than the tether. Thus, the tether is narrowed, and then widened.

In embodiments, a mating element may extend from the rim of the first cover member. The mating element may include a notch. The notch may be substantially as wide as or slightly wider than the width of the strip in the attachment element. The notch also is narrower than the retaining tab. A slot extends away from the rim from the notch to an opposite end of the mating element. The slot is as wide as or slightly wider than the thickness of the narrowed strip. Thus, in such an embodiment, the mating element may be twisted or rotated so that the strip member may be slid into the slot and moved to the notch, where it is rotated or twisted back to its original orientation.

One such embodiment is illustrated in FIG. 9. Attachment element 955 is engaged in mating element 960. Tether 950 extends to remote end 970 at attachment element 955. Attachment element 955 includes retaining tab 975 and strip member 976. As can be seen, strip member 976 is narrower than tether 950 and retaining tab 975 is wider than notch 961 and slot 962. Strip member 976 is within notch 961 in mating element 960. Slot 962 is slightly wider than the thickness of strip 955.

In some embodiments, fuel line 120 may be used to further secure attachment element in the mating element. Fuel line 120 may comprise a composition of matter that is able to exert some pressure on objects impinging on the path of the fuel line. For example, as illustrated in FIG. 1, fuel line 120 is adjacent to attachment element 155 and mating element 160. Thus, fuel line 120 may be used to further limit movement of strip member 176 out of notch 161, thus improving the security of the connection of tether 150, and thus second cover member 110, to first cover member 105.

A motor vehicle fuel pump cover system may be made from a composition that is waterproof, strong, and resilient. In particular, the composition may deform upon impact without rupturing. Such materials thus make it possible to form a motor vehicle fuel pump cover system from one material in one piece, for example. In some embodiments, the composition not only deforms without rupturing, but also is sufficiently flexible that the attachment element of the tether may be manipulated, i.e., rotated or twisted, sufficiently to make a correct attachment with the mating element. The composition also should be resistant to compositions commonly associated with motor vehicles, such as gasoline, motor oil, transmission fluid, brake fluid, road paving compositions, and cleaning agents. In some embodiments, the composition also is spark resistant. In some embodiments, the composition is electrically neutral and does not transmit electrical current.

In embodiments, closed-cell foams, especially polyolefin foams, may be suitable because they are waterproof, resilient, and typically durable. In some embodiments, the motor vehicle fuel pump cover system is made from closed cell polyethylene foam. Such foam often is available in densities ranging from about 1 lb/ft$^3$ to about 10 lb/ft$^3$. Closed-cell polyethylene foam typically is available in thicknesses between about 0.25 inch to about 2 inches. Thicker material may be made by adhering thinner layers to build up to the desired thickness. Selected areas may be made thicker than others to provide increased rigidity or other property or characteristic. Closed-cell materials may be especially useful in resisting attack by automotive chemicals.

Closed-cell foam may be vacuformed to obtain the desired shape. Foam is able to compress if necessary to mitigate damage to a motor vehicle, including in particular to the fuel pump and fuel pump connection, in the event of a collision or other damage to the motor vehicle fuel pump system. This feature may be particularly important in mitigating fuel leaks.

Non-foamed materials also may be used. Non-foamed materials may be thinner than foamed compositions having equivalent properties and characteristics, but may tend to provide less protection against damage in the event of an accident. Such products may be more rigid than foam, and may tend to break more easily. To the extent the material may be rigid, a different design may be necessary to ensure that this embodiment. With the guidance provided herein, a skilled practitioner will be able to select an appropriate composition, density, and thickness to provide a motor vehicle fuel pump cover system having the required properties and characteristics.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

I claim:

1. A motor vehicle fuel pump cover system for protectively covering a connection between a fuel line and a fuel pump, the cover system comprising:

a first cover member on a fuel tank and substantially covering the fuel pump and defining a raised wall around a fuel connection passage in the first cover member; and a second cover member hingedly connected to the first cover member and movable from an open position to a closed position in which the second cover member defines a dome to cover the connection exposed by the fuel connection passage, the dome having an interior peripheral surface that covers the raised wall to thereby form a chamber protected against foreign matter infiltration; and a locking tether comprising an arm extending from a periphery of the second cover member to a tab member for engagement with a mating element on the first cover member.

2. The motor vehicle fuel pump cover system of claim 1, comprising a material that deforms without rupture on impact.

3. The motor vehicle fuel pump cover system of claim 1, wherein the fuel line passes through the second cover member in an infiltration-resistant orifice.

4. The motor vehicle fuel pump cover system of claim 1, comprising a material that deforms without rupture on impact.

5. The motor vehicle fuel pump cover system of claim 1, wherein the fuel line passes through the second cover member in an infiltration-resistant orifice.

6. The motor vehicle fuel pump cover system of claim 1, further comprising a hinge tab connecting the first cover member and the second cover member, wherein the first cover member and the second cover member mate in a friction fit between two portions of a same surface of the cover system defined by an edge at a periphery of the cover system.

7. The motor vehicle fuel pump cover system of claim 1, wherein the first cover member and the second cover member mate in a friction fit.

8. A motor vehicle fuel pump cover system comprising:
a first cover member on a fuel tank and substantially covering a fuel pump and defining a raised wall around a fuel connection passage in the first cover member;

a second cover member which, when in a closed position, forms a protective chamber by cooperation of the first cover member and the second cover member, defining a dome to cover the fuel connection passage, the dome having an interior peripheral surface that covers the raised wall to thereby form a chamber protected against foreign matter infiltration; and a locking tether comprising an arm extending from a periphery of the second cover member to a tab member for engagement with a mating element on the first cover member.

9. The motor vehicle fuel pump cover system of claim 8, comprising a material that deforms without rupture on impact.

10. The motor vehicle fuel pump cover system of claim 8, further comprising an infiltration-resistant orifice in the second cover member.

11. The motor vehicle fuel pump cover system of claim 8, comprising a material that deforms without rupture on impact.

12. The motor vehicle fuel pump cover system of claim 8, further comprising an infiltration-resistant orifice in the second cover member.

13. The motor vehicle fuel pump cover system of claim 8, further comprising a hinge tab connecting the first cover member and the second cover member, wherein the first cover member and the second cover member mate in a friction fit between two portions of a same surface of the cover system defined by an edge at a periphery of the cover system.

14. A cover system for a motor vehicle fuel pump having an external connection, the cover system comprising:
a first cover member on a fuel tank and substantially covering a fuel pump and defining a raised wall around a fuel connection passage in the first cover member;

a second cover member mated with the raised wall on top of the first cover member;

wherein the first cover member and the second cover member define a protective chamber for the external connection exposed by the fuel connection passage; and a locking tether comprising an arm extending from a periphery of the second cover member to a tab member for engagement with a mating element on the first cover member.

15. The cover system of claim 14, comprising a material that deforms without rupture on impact.

16. The cover system of claim 14, further comprising a hinge tab connecting the first cover member and the second cover member, wherein the first cover member and the second cover member mate in a friction fit between two portions of a same surface of the cover system defined by an edge at a periphery of the cover system.

17. The cover system of claim 14, wherein the cover system protects the external connection from damage caused by infiltration of foreign material.

18. A cover system comprising:
a first cover member including a fuel connection passage;
a second cover member;
a hinge tab connecting the first cover member and the second cover member,
wherein an edge at a periphery of the cover system defines a first surface of the cover system and an infiltration-resistant orifice of the second cover member,
wherein the first cover member and the second cover member mate in a friction fit between two portions of the first surface of the cover system;
a locking tether of the second cover member; and
a mating element of the first cover member.

19. The cover system of claim 18, further comprising:
a raised wall in the first cover member around the fuel connection passage; and
a dome in the second cover member, wherein the infiltration-resistant orifice is in the dome,
wherein the raised wall and the dome are configured to mate the first cover member and the second cover member and define a chamber including the fuel connection passage and the infiltration-resistant orifice.

* * * * *